Dec. 11, 1928.
H. L. GOODWIN
1,694,378
COOKING VESSEL
Filed Jan. 31, 1927
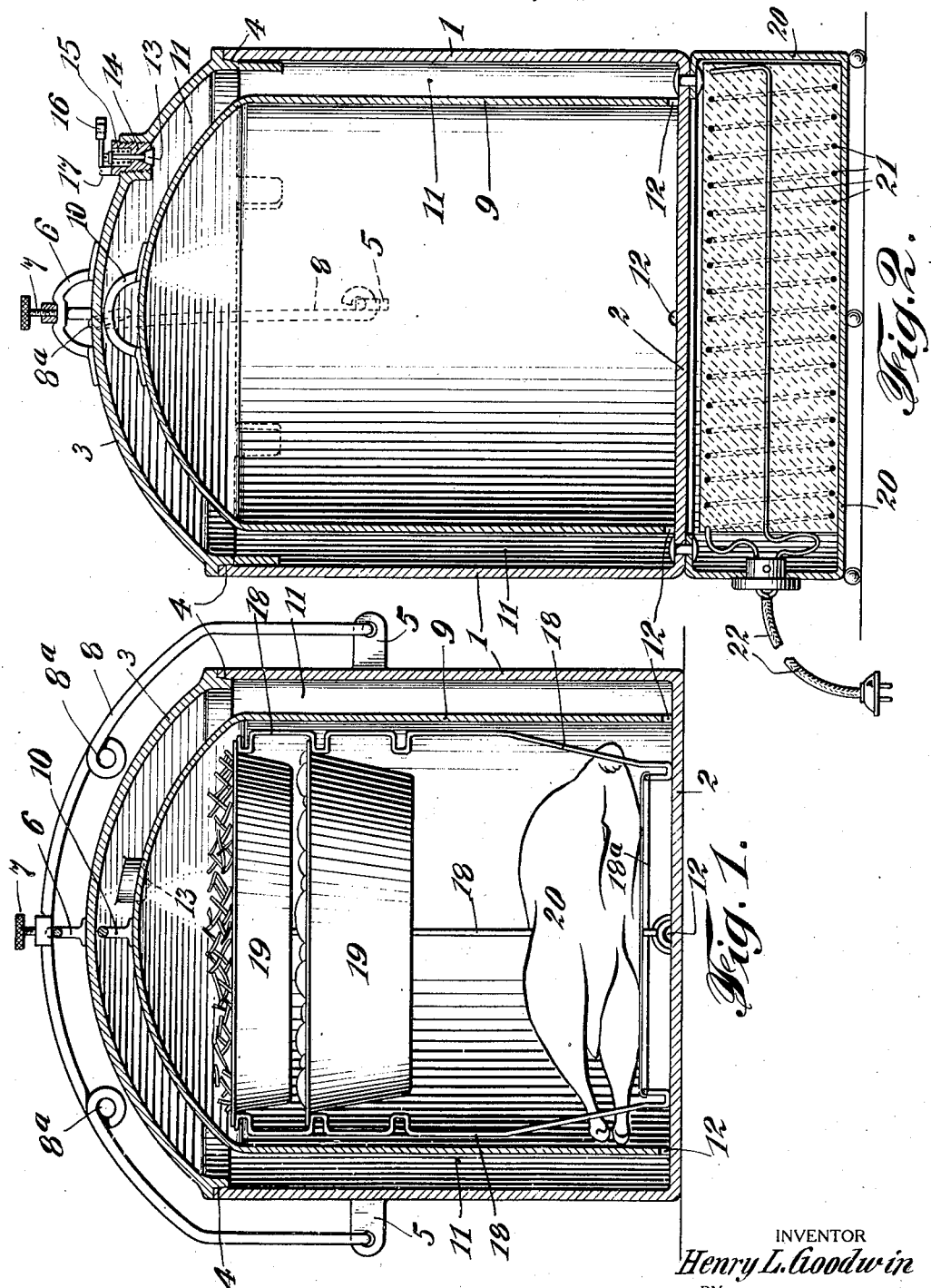
INVENTOR
*Henry L. Goodwin*
BY
*Ray Belmont Whitman*
his ATTORNEY Patented Dec. 11, 1928.

1,694,378

UNITED STATES PATENT OFFICE.

HENRY L. GOODWIN, OF NEW YORK, N. Y.

COOKING VESSEL.

Application filed January 31, 1927. Serial No. 164,717.

This invention relates to cooking vessels, and more especially to that type known as "pressure cookers"; and is adapted to be used either in conjunction with a stove using gas or other fuel, and also in combination with an electric heater.

An object of the invention is to provide a simple and economical cooking utensil particularly adapted for steaming cereals, vegetables, custards, puddings, and other foods to be cooked, so arranged that the heat and steam will have access to the sides of the vessel in which the food is placed, from top to bottom of said vessel, insuring the food being cooked quickly yet thoroughly and evenly throughout.

Another object is to provide such an apparatus with means to exclude the air, and other means for reducing or equalizing the pressure of the steam within, permitting the escape at will of a relatively small amount of the steam, such means being adapted to be manipulated, whereby the volume of the escaping steam may be increased, upon the increased generation of the steam within the apparatus.

Another object is to provide an apparatus in which steam is present at a pressure below that of the atmosphere.

A further object is to provide such an apparatus in which foods or other substances may be subjected to heat without causing harmful chemical changes, due to oxidation, which always results when air is present; and also in which these same materials will not have their most important food elements leached out by an excessive use of water and thrown away, as commonly happens according to the usual practise now in vogue.

Another object of the invention is to provide a cooking vessel that will have a continuous and automatically regulated supply of water so that it will require little or no attention after it is once placed upon the fire in order to keep the contents from being burned.

Another object of the invention is to make it possible to cook several articles of food or other substances at one time, and in the case where gas or oil burners are used, over one flame, thus accomplishing a maximum result with a low fuel consumption.

A further object is to provide apparatus of the above-mentioned character, which is simple in construction, inexpensive to manufacture, convenient, safe, durable, and readily portable.

A yet further object is to provide a method of heat- (or steam-) treating foods which will accomplish the object sought in the most efficient manner, in the minimum of time, and with the greatest possible economy in the use of the heating agent.

Other objects and advantages of this invention will be apparent from the following description.

Briefly described, the invention as illustrated, comprises a cooking vessel made up of outer and inner containers preferably of cylindrical shape, and being provided in part with a suitable cover; a hollow dome or steam-chest having a conical top and being open at its lower end; also one or more containers of different shapes to fit inside the steam-chest and intended to hold the materials to be cooked.

Referring now to the several figures of the drawing, forming a part of this specification, and in which like numerals are employed to designate like parts throughout the same, and wherein, for the purpose of illustration only, there is disclosed an embodiment of the invention:

Figure 1 is a diametrical cross-sectional elevation of the apparatus comprising this invention, and adapted for use over, or in conjunction with, a gas stove or other heating device.

Fig. 2 is of a similar view, but through a diametrical plane at right angles to that on which Fig. 1 is shown, and it shows a modification of the invention adapted for use as a self-contained heating and cooking device, in which there is incorporated in the base an electrical (or other) heating element.

Referring, now in detail, to the drawings, the numeral 1 designates an outer container of any suitable material, usually aluminum or other metal, the base portion 2 being made preferably of heavy aluminum to diffuse the heat. However, the base can also be constructed with radiating ribs of aluminum or like material, as an aid in preventing possible burning of the contents of the container.

The container 1 is provided with a quasi-spherical or other-shaped dome or top 3, fitting down over the upper edge of container 1 in such manner as to provide an air-tight joint 4, preferably along a beveled surface as shown, so the top 3 may be readily lifted off from the container 1. By flanging the lower edge of top 3 down into the upper edge of container 1, in the manner illustrated, said top can be readily positioned centrally over the container, will remain there to completely cover it, and when slightly lifted from said seat during its operation, will always return thereto automatically. However, it is contemplated, if found necessary or desirable, to arrange the top 3 with a series of, say, six prongs or guides to keep the top in line over the container, as it rises therefrom and lowers thereto when in use.

Integral with the container 1, and projecting outwardly from opposite sides, is a pair of lugs 5. At the apex of the top 3 is a bracket-handle 6 secured thereto, and containing suitable fastening means, such as a thumb-screw and nut 7. A resilient spring member, or bail, 8, made of spring steel wire or like material, and containing several coils 8ª to make it also resilient in form, is removably positioned in the container lugs 5 and top fastening-means 7 as shown. This arrangement holds the top 3 on its seat over the container 1 against the tension—which may be of any desired amount, being regulatable by means of thumb-screw and nut 7—of the spring 8, and yet permits it to be slightly lifted from its seat when the pressure from within becomes great enough, and thus the excess pressure escapes until reduced to a point where the spring tension again overcomes the internal pressure in container 1, permitting the top to return to its seat, and again form an air-tight seal at the joint 4. The member 8 also serves as a handle for carrying.

This top 12 is made dome-shaped so that the water from the condensing steam will flow down the inner surface and not drip into the food containers.

Now, in the complete assemblage of the apparatus, the top 3 being not yet in position, an inner container 9 is let down into the outer container 1, its lower edge resting on the inner surface of the base of said outer container, and its apex bracket-handle 10, similar to that numbered 6 which is integral with container 1, being arranged to just clear the inner surface of top 3 when said top is in air-tight position on its seat 4. This arrangement prevents the inner container 9 from rising out of position due to any abnormal condition of increased pressure within, and further aids in centrally positioning it within the outer container.

Inner container 9 is similar in shape to outer container 1 and its top 3, but is in one piece, as shown, and is somewhat smaller in diameter and height, thus providing for an enclosing chamber between the two containers when in operating position, as illustrated. This enclosing chamber 11 is of substantially uniform thickness around its sides and top. Inner container 9 has cut in to its side walls at or near its bottom edge a series of escape openings 12 to permit the water, air, and steam to pass between the inner and outer chambers formed by positioning the two containers as shown.

In the top of outer container 1 is an inwardly-acting relief valve 13, Fig. 12, contained in a threaded plug or housing 14 which latter is threaded into the top 3 as shown, the joint of course being air-tight. A coiled spring 15, in addition to the normal working pressure from within, keeps the valve on its seat, as shown. A rod 16, hinged at 17, is arranged to be pressed downwardly against the valve parts to force the valve 13 off its seat to permit the escape of gases from within. The handle of this rod 16 is preferably a wire coil, or the like construction, to prevent it from getting too hot to handle.

Positioned within inner container 9 is a carrying-frame 18 of wire or like material, for suspending a plurality of food-contained vessels 19, Fig. 1, as in the manner suggested in the drawing. It may also include a base member 18ª preferably raised above the bottom 2 of container 1, for the purpose of holding a fowl 20, or other meats or foods to be cooked.

The modification shown in Fig. 2 differs from that of Fig. 1 in having attached beneath its base an additional cylindrical container 20 which houses an electrical heating element, for instance, the usual coil of resistance wire being shown at 21, the terminals contained in cable 22 being connected to a source of electric current. An asbestos base, not shown, might be provided to segregate the heat from the surface 23 on which the apparatus rests. In this form the apparatus in self-contained, and operates of itself, whereas the form shown in Fig. 1 must be positioned over a stove or other heater.

The operation of the apparatus is as follows:

When heat is applied at the base 2 of outer container 1, the air within the inner container 9 expands, and is driven out into the chamber 11. In cooking certain foods it is sometimes desirable to place a small quantity of water to cover the base 2 and within outer container 1. Steam is generated from this by the application of the heat. Where no water is introduced, the water-content of the foods in pans 19 will in any event be partly or largely turned into steam. Initially, this steam rises, and displaces the air in the inner container, forcing it out into the outer chamber 11. At the beginning of the cooking operation, the operator lets a part of this air escape, by depressing valve 13 in the manner heretofore described. This air, or a part of it, is replaced in the chamber 11 by some of the generated steam. The mixture of air and steam, or largely steam, to which heat is constantly being applied, remaining in chamber 11, has been found to be an excellent non-conductor of heat, and so insulates the heat contained in the apparatus from being dissipated, either by conduction, convection, or radiation, into the surrounding colder atmosphere, thus giving the effect of a fireless cooker. Best results are usually obtained by "juggling" the valve 13 only a little, permitting just enough of the air to escape to remove the surplus from the inner or cooking chamber.

As the heating proceeds, the pressure builds up within, and soon becomes sufficient to overcome the spring tension by which the top 3 is held down over container 1. At that point top 3 lifts off its seat, breaking the air-seal at joint 4, and there is a sufficient escape of the contained steam or gaseous mixture to lower the pressure again to the desired and safe amount.

Of course, the pressure is the same in both outer and inner containers, because of the communication provided by the openings 12. The outer chamber 11 contains a mixture of air and steam which serves most effectively as an insulating wall.

In order to convert the "pressure cooker," which is the method of operation just described, into a "steamer" it is only necessary to keep the valve 13 open, as by providing a weight on lever-handle 16 to keep valve depressed off its seat. This maintains the pressure within at or near the pressure of the atmosphere without, and the device then functions in the usual "steamer" fashion.

When the heat is removed, and container and contents start to cool off, the vacuum created soon creates a sufficient difference of pressure without and within to depress valve 13, admitting air to an equalizing point. The introduction of this air, moving mostly downwardly along the outer chamber 11, further aids the insulation. It also prevents undue crushing strain on the container or containers. Prior to this action, the partial vacuum which has been created is also effective in heat-insulating the containers.

Attention is directed to an especially novel and important feature of this apparatus, as follows:

The replacement of all, or substantially all, the air in the cooking chamber, by the steam generated, prevents loss of food by oxidation. This is of great importance from a food economy standpoint, as well as from the standpoint of preserving in the food those health-building elements which might otherwise be destroyed.

Also the invention may be employed successfully as a combined cooker for the preparation of the food, and a heatless cooker, for maintaining the food in a hot condition until ready to serve. The heated air and steam generated during cooking fills the chamber 11, and serves excellently as a heat insulating wall, preventing the dissipation of the heat content from the container or food for relatively long periods.

The construction is such that no water need be added either to effectively cook the materials, or prevent their burning. In this respect the invention also comprises a "waterless" cooker.

The apparatus has been described in considerable detail. This is not to be taken as a limitation of the invention, however, for it is obvious that various changes can be made by one skilled in the art without departing from the spirit of the invention, the various features of which are intended to be set out in the following claims.

Having now described the invention, what is claimed as new, and for which Letters Patent of the United States is desired, is:

1. In combination, a container, a removable air-tight cover therefor, spring means for holding the cover on to the container from without, a pressure relief valve operated inwardly, a second container enclosed within the first-mentioned container and positioned substantially equi-distant therefrom on top and sides, and having a closed top and open bottom, openings in the inner container communicating with the outer container, and means in the inner container for supporting a plurality of material-containing holders.

2. A cooking vessel comprising a nest of containers, an inner one having a closed top and an open bottom, and having openings communicating with an outer container which completely encloses it, and food containers positioned within the inner container.

3. In a cooking vessel, an outer container, and an inner container placed in spaced relation thereto and completely enclosed thereby, and having its bottom end open and its top closed, with means for holding the bottom of the inner container substantially against the bottom of the outer container, and being adapted to gradually release same from same an appreciable amount.

4. The invention as in claim 3, there being water passage openings in the inner container.

5. The invention as in claim 3, the inner container comprising within it one or more containers, for holding the materials to be processed, resting upon the bottom of outer container.

6. In combination, a container in which steam is generated, a second container communicating therewith and completely enclosing the first container and having a cover adapted to raise under excess pressure, the passage between the two containers being substantially at the bottom.

7. In combination, a container, an air-tight cover therefor, means for permitting the cover to raise during excess pressure, a second container completely enclosed by the first container and communicating therewith through openings positioned substantially at its bottom.

8. In combination, a container, a pressure relief valve operated inwardly, a second container completely enclosed by the first container and communicating therewith near the bottom, and means for permitting the escape of excess pressure outwardly from the first container.

9. The invention as in claim 3, including means for holding the materials spaced above the bottom of the container.

10. The invention as in claim 6, there being an inwardly-acting vacuum-release valve in the cover.

11. The method of cooking which comprises subjecting the material to be cooked to the action of steam in a container to drive out the air therefrom, and then utilizing the steam for insulating the walls of the container.

Signed at New York in the county of New York and State of New York this 28th day of January, A. D. 1927.

HENRY L. GOODWIN.